United States Patent [19]
Tandetzke

[11] 3,881,667
[45] May 6, 1975

[54] SAFETY-BELT LOCKING DEVICE

[75] Inventor: Norbert Karl Albert Tandetzke, Erftstadt-Gymnich, Germany

[73] Assignee: Kangol-Teka, Sicherheitsgurt GmbH, Bruhl, Germany

[22] Filed: June 20, 1973

[21] Appl. No.: 371,938

[30] Foreign Application Priority Data
June 24, 1972 Germany............................ 2230994

[52] U.S. Cl........... 242/107.4; 280/150 SB; 297/386
[51] Int. Cl........................ A62b 35/00; B65h 63/00
[58] Field of Search........ 242/107 SB, 107.3, 107.4, 242/99; 297/386, 388; 280/150 SB

[56] References Cited

UNITED STATES PATENTS

| | | | |
|---|---|---|---|
| 3,203,641 | 8/1965 | McFarlane et al. | 242/107.4 |
| 3,220,747 | 11/1965 | Marion | 297/386 |
| 3,495,786 | 2/1970 | Hemens | 242/107.4 |
| 3,741,494 | 6/1973 | Fiala | 242/107 SB |

*Primary Examiner*—Edward J. McCarthy
*Attorney, Agent, or Firm*—Williamson, Bains & Moore

[57] ABSTRACT

A safety-belt locking device is interposed between and interacts with the hub and spindle of the safety-belt drum about which the safety-belt is wound. The spindle of the safety-belt drum is connected to a free-running mechanism, of conventional construction, which allows the spindle the normally rotate with the hub and permit unwinding of the belt to thereby interfere as little as possible with the movement of the user. The spindle is locked against movement with the hub by the free-running mechanism when a collision occurs, and the interacting locking and braking components permit limited forcible rotation of the hub relative to the spindle before the hub is locked against rotative movement. In certain embodiments of the invention, components associated with the spindle react with the deformable elements associated with the hub to permit limited forcible or retarded rotation of the hub relative to the spindle before the hub is locked against movement. When the hub is locked against movement, the belt is no longer extensible. In other forms of the invention, the braking action is exerted on the hub by interacting braking elements or by a viscous fluid while interacting stop elements ultimately prevent any movement of the hub relative to the spindle.

8 Claims, 13 Drawing Figures

SAFETY-BELT LOCKING DEVICE

SUMMARY OF THE INVENTION

The invention relates to a safety-belt locking device whereby the substantially non-extensible belt is unwound with the free-running mechanism locked and a braking action applied.

As is well known, safety-belts are used for securing the occupants of motor vehicles and aircraft firmly in their seats when the vehicle or aircraft undergoes abnormal acceleration in the transverse direction or slows down in the direction of travel. In all other travel situations however, the belt should unwind from its drum in order to interfere as little as possible with the movement of the traveller.

The means for locking and releasing the free-running mechanism of the belt drum do not form the subject-matter of this invention; various forms of these means are known.

It is also known that ideally the belt should not be rigidly secured but should be capable of yielding in a controlled manner — for example when a collision occurs in the direction of travel — so that the force resulting from deceleration and the weight of the traveller is transmitted to a braking system. Efforts have been made to design the belts as plastically deformable elements, and it has also been endeavoured to combine a brake unit with a substantially non-extensible belt.

The invention is concerned with this last-mentioned form of construction. The object of the invention is to provide a means for braking the unwinding movement of the belt, the space occupied by said means being so small that the complete arrangement consisting of the drum of the safety-belt, the locking and free-running control means and the belt can be readily fitted in a motor vehicle or aircraft.

According to the invention, this object is achieved by accommodating the braking means in the interior of the hollow hub of the belt drum.

Various preferred forms of construction of the article of the invention are illustrated in the drawings and each will now be described.

FIGURES OF THE DRAWINGS

Figure 1:
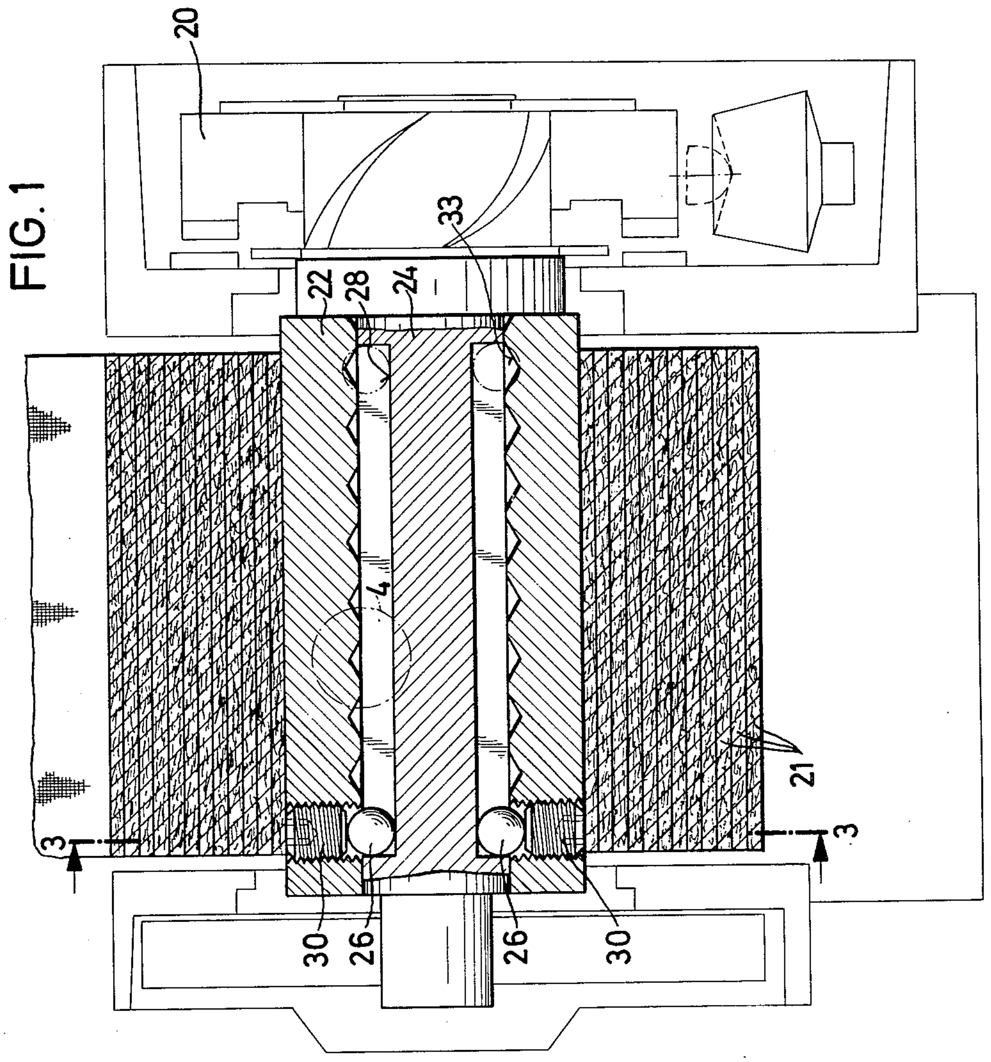
FIG. 1 is a longitudinal section of the safety-belt drum taken approximately along the axial plane of the belt drum.
Figure 4:
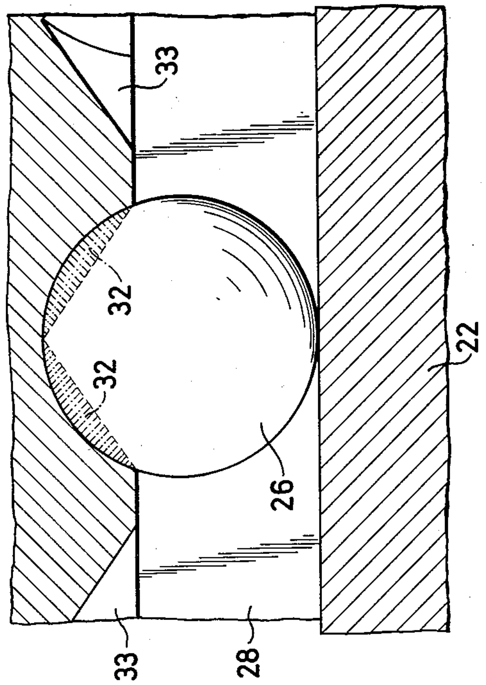
FIG. 4 is a fragmentary cross-sectional view on an enlarged scale of a portion of the drum and illustrating details of construction thereof.
Figure 2:
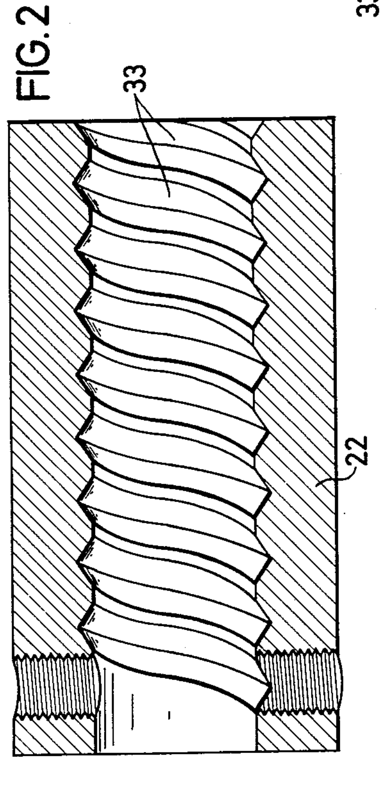
FIG. 2 is a longitudinal sectional view of the hub taken approximately along the axial plane thereof.
Figure 3:
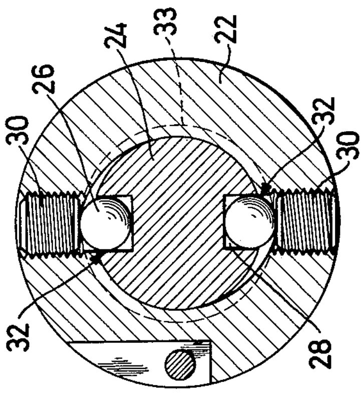
FIG. 3 is a cross-sectional view taken approximately along line 3—3 of FIG. 1 and looking in the direction of the arrows.

FIG. 1 shows the belt coil 21 (i.e., the turns of the belt) wound on the hub 22. The free-running and locking mechanism 20 is shown diagrammatically on the right of this Figure, the construction of this mechanism being important in the context of the present invention only insofar as under abnormal acceleration conditions the locking mechanism locks a spindle coaxial with the hub, against rotation. As long as the spindle 24 is released, it rotates together with the hub 22 during the winding and unwinding of the belt, since the balls 26 are clamped between these two parts. On one side the balls are sunk in an axial channel 28 in the spindle and to such depth that they are guided at their sides (see FIG. 3). They are held in this position by the grub screws 30 which are screwed radially into the hub 22. On the one hand, stop segments 32 prevent the hub from rotating freely on the spindle, while on the other hand these segments are so narrow that they deform plastically when the spindle 24 is held fast and when pull is applied to the belt 21, and the hardened balls roll along a helical track 33. It will be appreciated that with two balls a kind of double-start internal screw-thread is provided in the hub as a guide means and also as an extension of the path along which deformation occurs. Four spires of a screw-thread are associated with each ball, so that after four revolutions the hub is blocked in relation to the spindle when the balls have reached the position, shown in broken lines in FIG. 1, at the right-hand end (as shown in the drawing) of the spindle.

Figure 5:
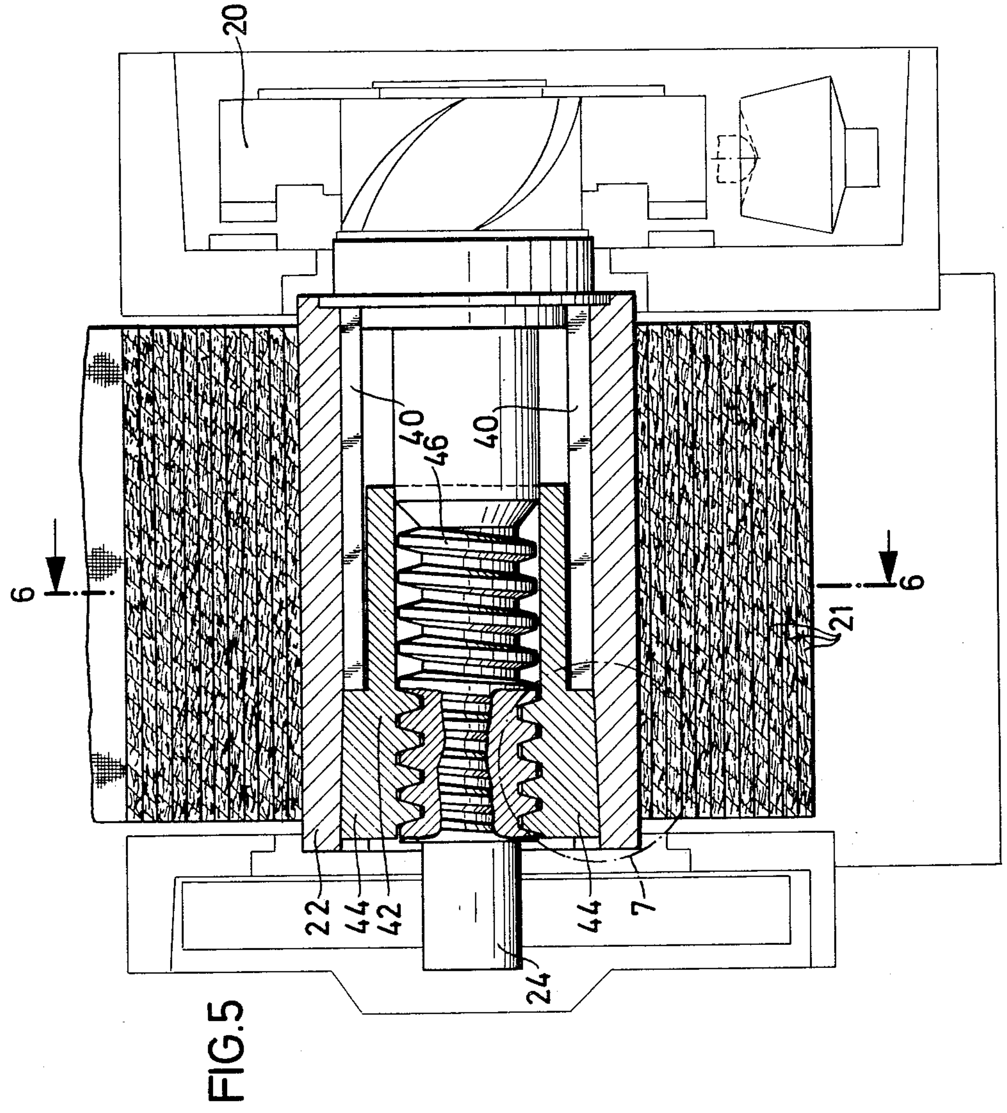
FIG. 5 is a longitudinal section of a different embodiment of a safety-belt drum taken approximately along the axial plane thereof.
Figure 7:
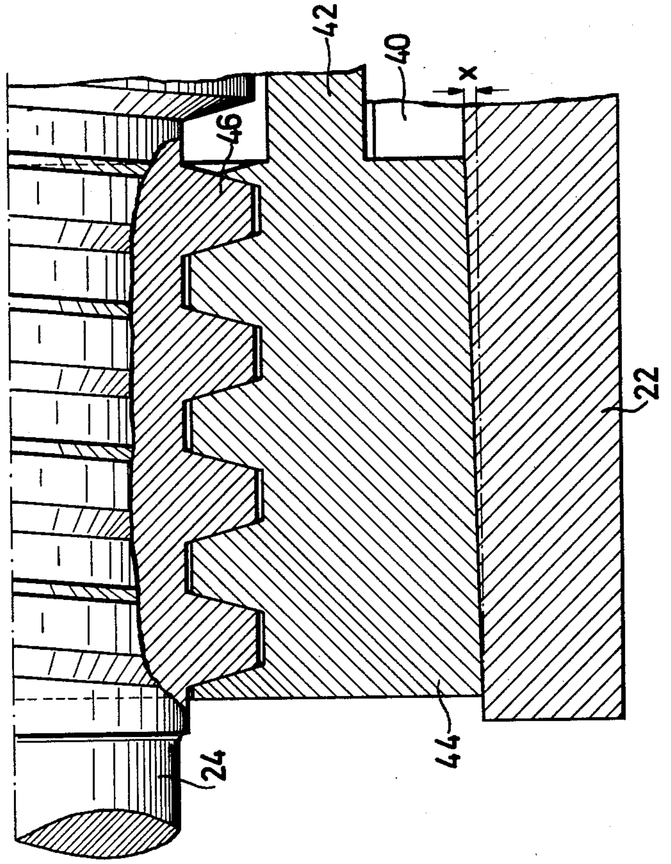
FIG. 7 is a fragmentary cross-sectional view of a portion of the safety-belt drum illustrated in FIG. 5 and showing details of construction thereof.
Figure 6:
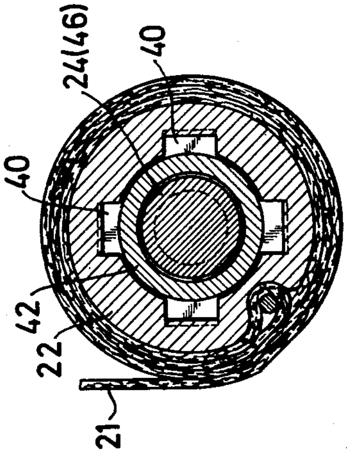
FIG. 6 is a cross-sectional view taken approximately along line 6—6 of FIG. 5 and looking in the direction of the arrows.

In the form of construction shown in FIGS. 5 to 7, the locking mechanism 20, the belt 21, the hub 22 and the spindle 24 can be seen, and these co-operate as in the previous example, the difference here being that the hub has four axial channels 40 and the spindle 24 has a male thread (here a trapezoidal thread, see FIG. 7). At the left-hand end of the hub (as viewed in the drawing) the channels widen in the outward radial direction, and at this point a nut 42 having four wedge noses or wedge lugs 44 is screwed onto the spindle 24. When the spindle 24 is blocked in relation to the hub, the latter turns the nut 42 which meshes with it by way of the wedge noses. Since the wedge noses 44 also widen in the outward direction, the hub 22 is of necessity plastically deformed in the outward direction at the grooves 40. As long as the spindle 24 is released, the spindle is driven in a simple manner by the hub for the same reason, when pull is applied to the belt. FIG. 7 shows the extent X of the radial deformation.

Figure 8:
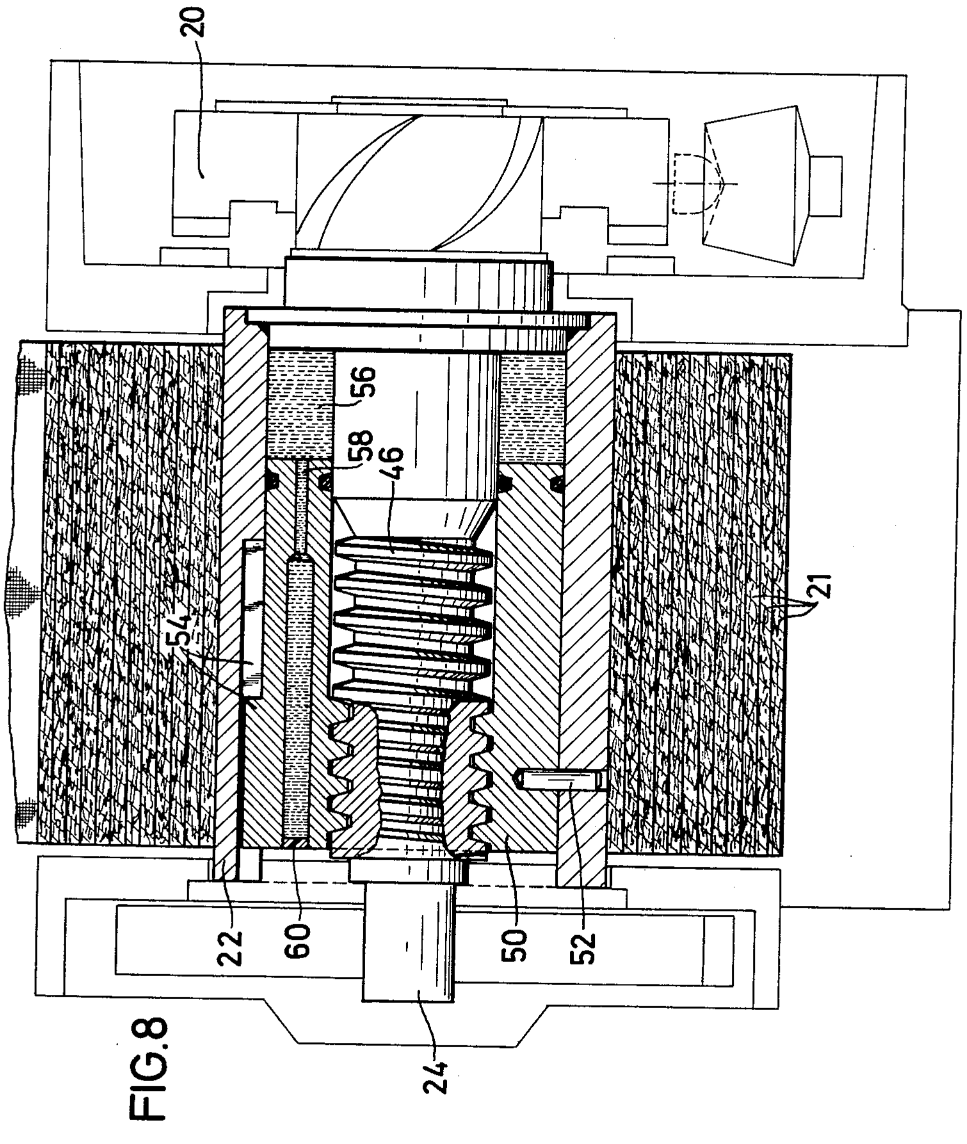
FIG. 8 is a longitudinal cross-sectional view taken approximately along the axial plane of a further embodiment of the brake drum.

The arrangement shown in FIG. 8 again includes the locking mechanism 20, the belt coil 20, the hub 22 and the spindle 24. Fitted between the hub 22 and the spindle 24 is a hollow plunger 50 which is sealed off from the spindle 24 and is connected to the hub 22 by a shear pin 52 on the one hand and a tongue and groove joint 54 on the other. At the left-hand end (as viewed in the drawing), the hollow plunger 50 has an internal screw-thread, whereas the spindle 24 has a complementary male screw-thread. The hollow plunger does not extend quite to the right-hand end of the spindle 24, so that a chamber 56 is formed which is filled with plastically deformable and preferably amorphous mass (wax or mixtures of pitch for example, though high-viscosity liquids may also be used). Distributed about its periphery, the hollow plunger has flow-restricting openings 58, only one of which can be seen in the drawing. Each flow-restricting opening is widened at the left and is closed by a plug 60. When the pull applied to the belt 21, when the spindle 24 is blocked, reaches a predetermined value, the shear pin 52 is sheared, and because of the tongue and groove connection with the hub the hollow plunger 50 is forced to move to the right, thereby passing along the screw-thread of the spindle 24. As this happens, the composition in the chamber 56 is forced through the flow-restricting openings 58 and energy is converted into heat. No seal is provided to the rear of each flow-restricting opening so that the composition is able to spread out in all directions for reasons of safety, once a belt has been overstretched it is usually removed and replaced but not put together again.

Figure 9:
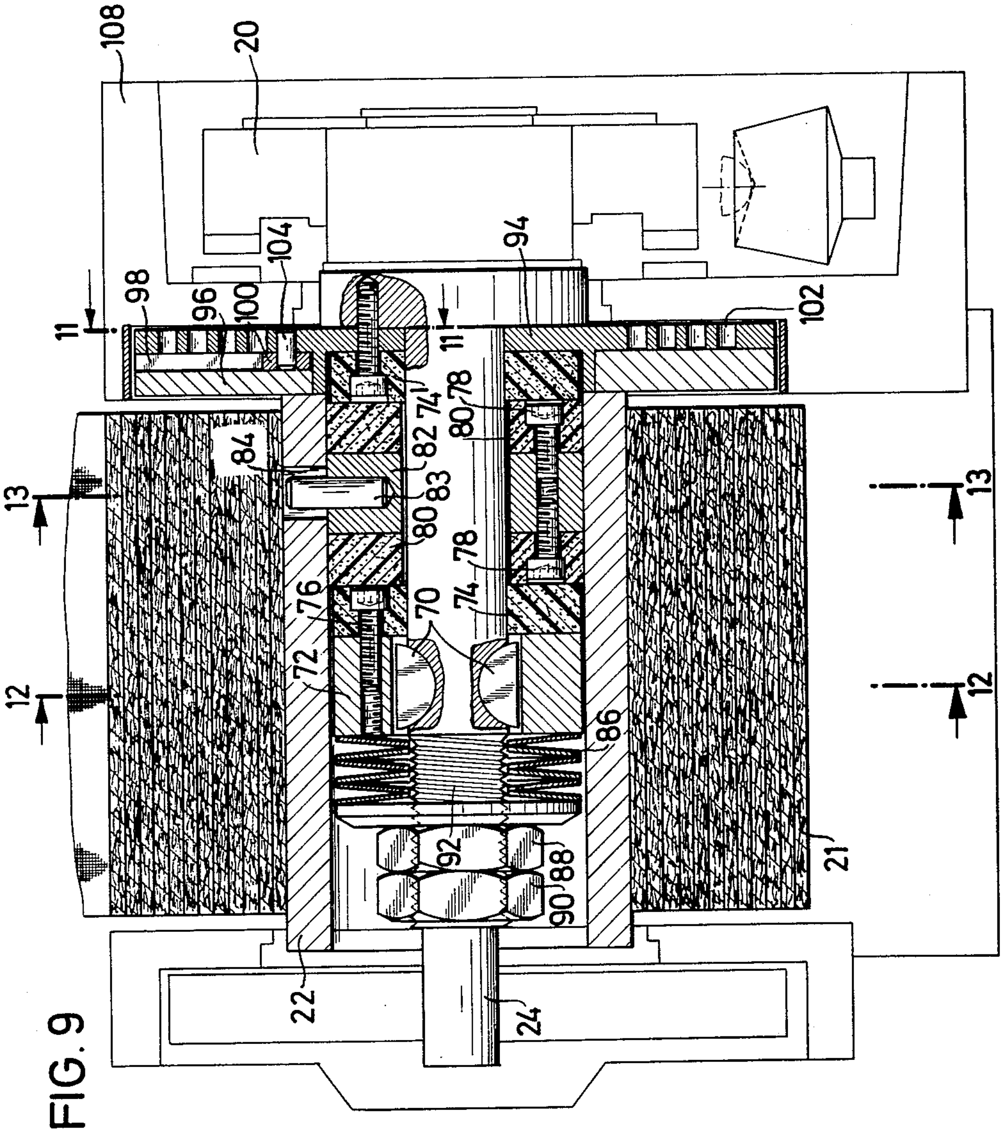
FIG. 9 is a longitudinal cross-sectional view taken approximately along the axial plane of a different embodiment of the safety-belt drum.
Figure 12:
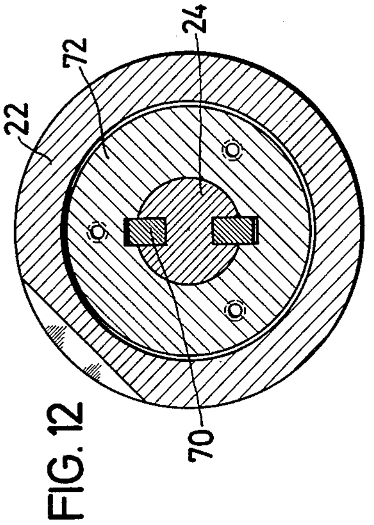
FIG. 12 is a cross-sectional view taken approximately along line 12—12 of FIG. 9 and looking in the direction of the arrows.
Figure 13:
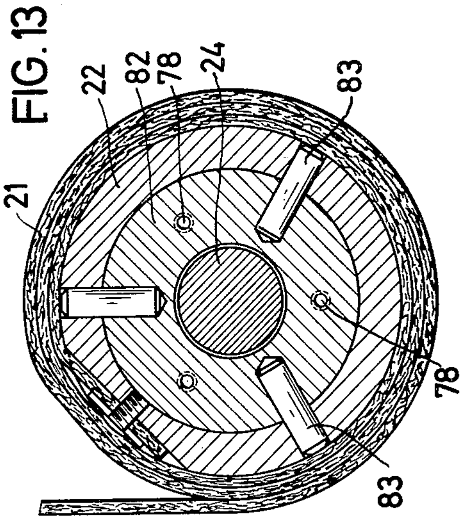
FIG. 13 is a cross-sectional view taken approximately along line 13—13 of FIG. 9 and looking in the direction of the arrows.
Figure 10:
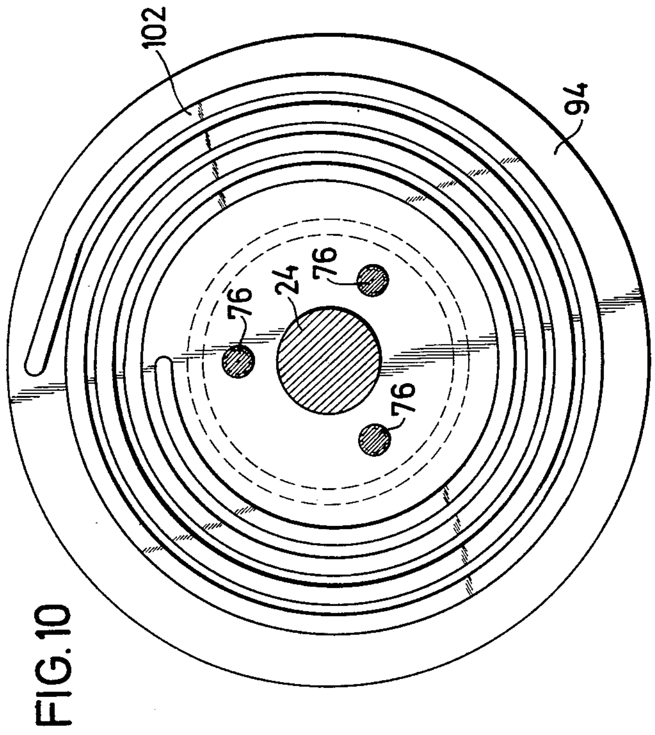
FIG. 10 is a vertical cross-sectional view of the safety-belt drum illustrated in FIG. 9 and showing details of construction of the spirally grooved disc thereof.
Figure 11:
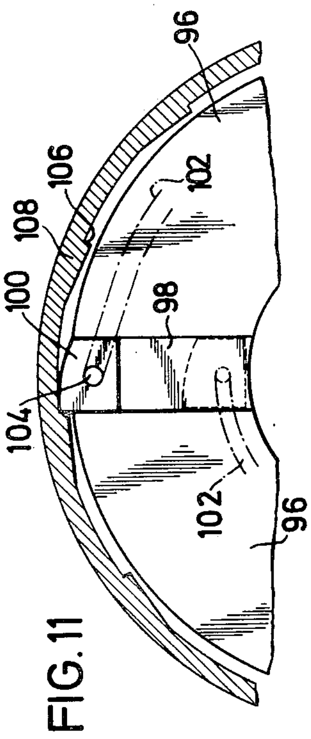
FIG. 11 is a cross-sectional view taken approximately along line 11—11 of FIG. 9 and looking in the direction of the arrows.

Finally, FIGS. 9 to 11 illustrate a modified form of construction in which however the braking mechanism is likewise accommodated in the hollow hub 22 for the belt coil 21. As in the case of the previously described arrangements, a spindle 24 fitted concentrically with the hub 22 is in this case too blocked with the aid of the free-running and locking mechanism 20. With the aid of teeth 70 a sleeve 72 is mounted on the spindle 24 so as not to rotate relatively thereto though it is axially displaceable along said spindle; a friction lining 74 is secured to the sleeve by means of screws 76. In mirror symmetry with this arrangement, a further friction lining 74' is secured, likewise, by means of screws 76, to the end of the spindle (on the right in FIG. 9). Connected to the hub 22 through one or more pins 83, which fit in an axially extending slot 84 in the hub, is a brake disc 82 having brake linings 80 secured thereto by means of screws 78. Engaging the sleeve 72 is a set of dished washers 86, the unbias of which is adjustable by means of a nut 88 and a check nut 90 which are screwed and held on a male-threaded portion 92 of the spindle 24. In this way, the friction between the brake linings 80 and the friction linings 74 and 74' can be adjusted, and the amount of energy that has to be applied when turning the hub 22 relatively to the spindle 24 can thus also be adjusted. In order to limit the number of turns for the hub in this case too, a spirally grooved disc 94 is screwed onto the spindle 24, whereas the hub 22 has a radially grooved disc 96. Sliding in the radial groove 98 of the disc 96 (see FIGS. 10 and 11) is a wedge element 100 which is guided near its exterior by means of a stud 104 engaging in the spiral groove 102. After four revolutions of the hub 22, the wedge element 100 moves into engagement with one of the radial stops 106 which are machined in the inner periphery of the housing 108 for the blocking means, so that the hub also is blocked against rotation. The reason for this provision is of course that the occupants of a motor vehicle or aircraft need to move over only a limited distance to avoid striking obstacles in front of them such as a windscreen or a front seat. In the arrangement illustratged in FIGS. 5 to 7, this distance of movement is limited by the length of the wedge nose nut which moves on the end of the spindle; the same applies as regards the hollow plunger used in the arrangement shown in FIG. 8. It will be understood that the number of permissible turns can be provided by suitably selecting the pitches of the screw-threads the axial dimensions etc., whereas the energy consumption can be adjusted by varying the radial dimensions in the last-mentioned forms of construction. In the case of the other arrangements however, the person skilled in the art will know which parameters require to be varied in order to influence the two factors.

What is claimed is:

1. A safety-belt apparatus for vehicles comprising:
a drum including an elongate hollow hub member,
a safety-belt wound upon said hub member,
an elongate spindle member positioned interiorly of said hub,
a free-running mechanism operatively associated with the spindle member normally permitting said spindle member to rotate with said hub member to thereby permit extension of the belt, said free-running mechanism when subjected to abnormal acceleration locking the spindle member against rotation with respect to said hub member,
one of said hub and spindle members having threads thereon and the other of said hub and spindle members having an elongate channel therein, one of said hub and spindle members being formed of plastically deformable material,
and a braking element engaging said channel and threads of said hub and spindle members and moving longitudinally of the latter when the spindle member is locked against rotation with respect to the hub member, said braking element deforming said plastically deformable member during the longitudinal movement to thereby brake rotation of the hub member.

2. The safety-belt apparatus as defined in claim 1 wherein said spindle member has an elongate axially extending channel therein, said brake element comprising a ball element positioned in said channel and being movable therein during braking of said hub member, said hub member having an internal helical thread formed of a deformable material, and being engaged and deformed by said ball element during said braking action.

3. The safety-belt apparatus as defined in claim 1 wherein said hub member, spindle member and braking element are operable when said spindle member is locked against rotation to limit the forceable braked rotation of the hub member relative to the spindle member to a predetermined number of revolutions.

4. The safety-belt apparatus as defined in claim 1 wherein said hub member is provided with said channel in the inner periphery thereof, and wherein said spindle member is provided with external threads.

5. The safety-belt apparatus as defined in claim 4 wherein said brake element comprises a nut threadedly engaging the threads on said spindle and having a key element thereon projecting outwardly therefrom and positioned in and engaging said channel.

6. The safety-belt apparatus as defined in claim 4 wherein said hub is formed of a plastic deformable material.

7. The safety-belt apparatus as defined in claim 1 wherein said hub member is formed of a plastic deformable material and is provided with a plurality of elongate longitudinally extending channels in the inner surface thereof, said spindle member being externally threaded, said braking element comprising a nut threadedly engaging said spindle and having a plurality of keys thereon, each projecting outwardly and engaging in one of said channels in said hub member.

8. The safety-belt apparatus as defined in claim 1 wherein said spindle is provided with a plurality of elongate axially extending channels therein and wherein said hub is formed of a plastically deformable material and is provided with internal threads, a plurality of ball elements, each being positioned in one of said channels and being movable longitudinally of said spindle and hub members during the braking action to plastically deform the threads of the hub member.

* * * * *